(12) United States Patent
Cagno et al.

(10) Patent No.: US 8,302,137 B2
(45) Date of Patent: Oct. 30, 2012

(54) APPARATUS AND METHOD TO PROVIDE A SIGNAL USING A COMMUNICATION LINK

(75) Inventors: Brian J. Cagno, Tucson, AZ (US);
Matthew D. Bomhoff, Tucson, AZ (US);
Gregg S. Lucas, Tucson, AZ (US);
Kenny N. Qiu, Tucson, AZ (US);
Andrew E. Seidel, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1795 days.

(21) Appl. No.: 10/675,869

(22) Filed: Sep. 29, 2003

(65) Prior Publication Data

US 2005/0068821 A1    Mar. 31, 2005

(51) Int. Cl.
*H04N 7/173*     (2011.01)
*H04N 7/16*      (2011.01)
*G06F 13/00*     (2006.01)
*G06F 13/28*     (2006.01)

(52) U.S. Cl. ............... 725/93; 725/91; 725/92; 725/94; 725/95; 725/96; 725/127; 725/128; 725/145; 725/146; 711/114

(58) Field of Classification Search .................. None
See application file for complete search history.

(56) References Cited

U.S. PATENT DOCUMENTS

| | | | | |
|---|---|---|---|---|
| 4,218,745 A | 8/1980 | Perkins | | 364/489 |
| 4,597,183 A | 7/1986 | Broding | | 33/125 |
| 5,682,100 A | 10/1997 | Rossi et al. | | 324/535 |
| 5,910,776 A | 6/1999 | Black | | 340/825.35 |
| 6,296,514 B1 * | 10/2001 | Medina et al. | | 439/404 |
| 6,466,626 B1 * | 10/2002 | Cecchi et al. | | 375/257 |
| 6,554,492 B2 * | 4/2003 | Gilliland et al. | | 385/88 |
| 2002/0095685 A1 | 7/2002 | Baldus et al. | | 725/107 |
| 2002/0104039 A1 * | 8/2002 | DeRolf et al. | | 714/30 |
| 2002/0156944 A1 * | 10/2002 | Benhase et al. | | 710/8 |

FOREIGN PATENT DOCUMENTS

| JP | 60067808 | 4/1918 |
|---|---|---|
| JP | 62-147310 | 7/2001 |
| JP | 1175428 | 7/2011 |

OTHER PUBLICATIONS

Anil K. Sahai, "Performance Aspects of RAID Architecture", IEEE 1997, pp. 321-327.*
Phillips Semiconductors, "hitag", Sep. 24, 2001, pp. 2-7.
SFF Committee, "SFF-8053 Specification for Gigabit Interface Converter", Sep. 27, 2000, pp. 1-66.

* cited by examiner

*Primary Examiner* — Kristine Kincaid
*Assistant Examiner* — James Marandi
(74) *Attorney, Agent, or Firm* — Dale F. Regelman; Quarles & Brady LLP

(57) ABSTRACT

A method to provide a signal using a communication link. The method disposes a passive transponder on the communication link, where that passive transponder includes a memory. The method reads information relating to the communication link from the memory, and then, based upon that information, adjusts certain characteristics of a signal provided using the communication link.

29 Claims, 6 Drawing Sheets

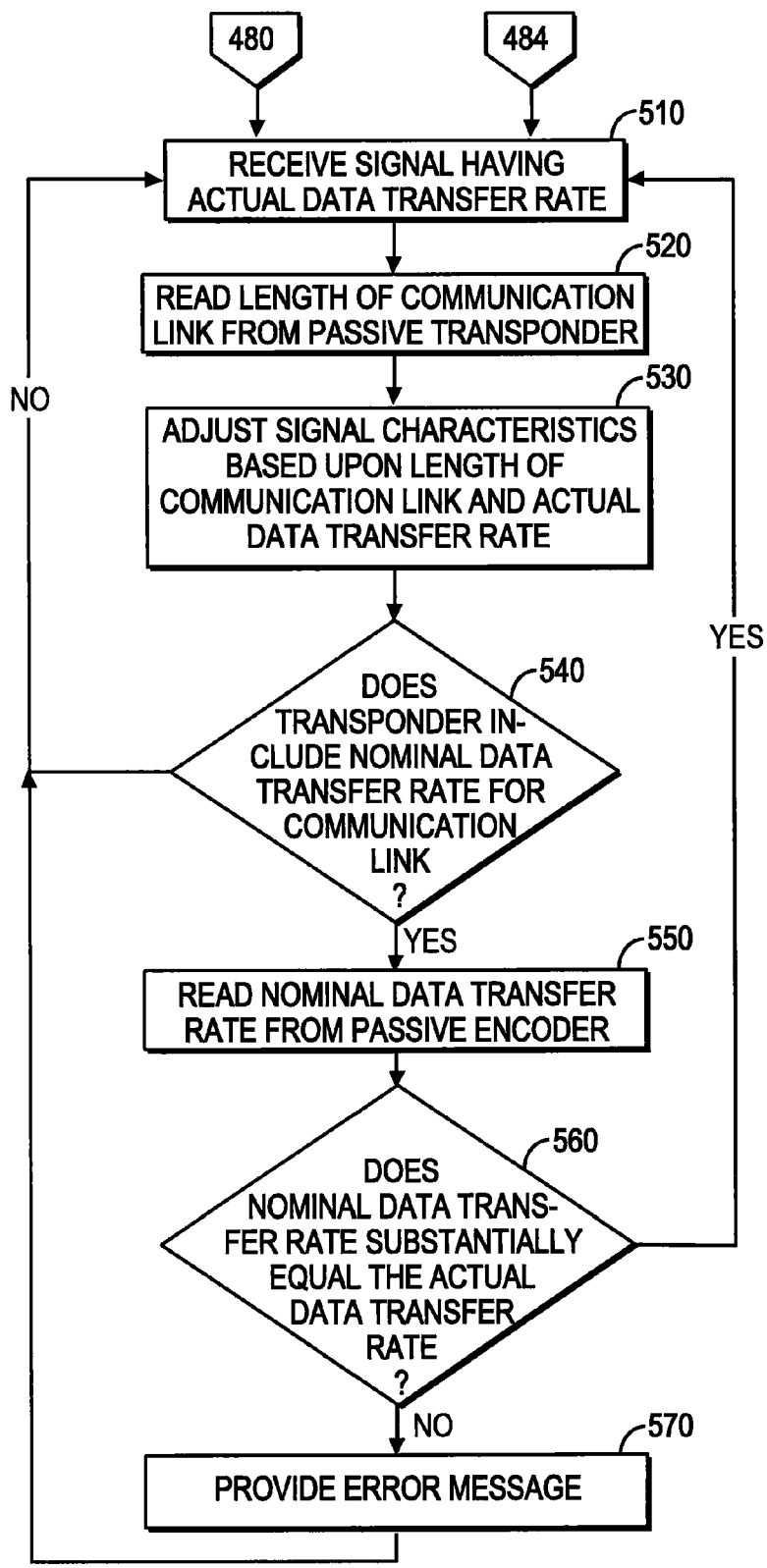

600

610

US 8,302,137 B2

APPARATUS AND METHOD TO PROVIDE A SIGNAL USING A COMMUNICATION LINK

FIELD OF THE INVENTION

The invention relates to an apparatus and method to provide a signal using a communication link. More specifically, the invention relates to an apparatus and method to dynamically adjust the characteristics of a signal provided via a communication link based upon the length of that communication link.

BACKGROUND OF THE INVENTION

Data storage and retrieval systems are used to store information provided by one or more host computer systems. Such data storage and retrieval systems receive requests to write information to one or more information storage devices, and requests to retrieve information from those one or more information storage devices. Upon receipt of write request, the system stores information received from a host computer in a data cache. In certain implementations, a copy of that information is also stored in a nonvolatile storage device. Upon receipt of a read request, the system recalls information from the one or more information storage devices and moves that information to the data cache.

Thus, the system is continuously moving information to and from storage devices, and to and from the data cache. One or more communication links interconnect one or more device adapters and the one or more information storage devices.

As the speed at which data is transferred between the device adapters and the storage devices over the one or more communication links, the physical length of those one or more communication links affect the data transfer rate, the data integrity, and the overall system reliability.

What is needed is an apparatus and method to dynamically adjust signal characteristics, such as signal pre-emphasis, for a signal transferred over a communication link based upon, among other things, the physical length of that communication link.

SUMMARY OF THE INVENTION

Applicants' invention includes an apparatus and method to provide a signal using a communication link. The method disposes a passive transponder on the communication link, where that passive transponder includes a memory. The method reads information relating to the communication link from the memory, and then adjusts certain characteristics of the signal based upon that information.

BRIEF DESCRIPTION OF THE DRAWINGS

The invention will be better understood from a reading of the following detailed description taken in conjunction with the drawings in which like reference designators are used to designate like elements, and in which:

FIG. 5 is a flow chart summarizing additional steps of Applicants' method;

DETAILED DESCRIPTION OF THE PREFERRED EMBODIMENTS

Referring to the illustrations, like numerals correspond to like parts depicted in the Figures. The invention will be described as embodied in a data storage and retrieval system. The following description of Applicants' method to provide a signal using a communication link is not meant, however, to limit Applicants' invention to data processing applications, as the invention herein can be applied to transmission of signals over communication links in general.

Figure 1:
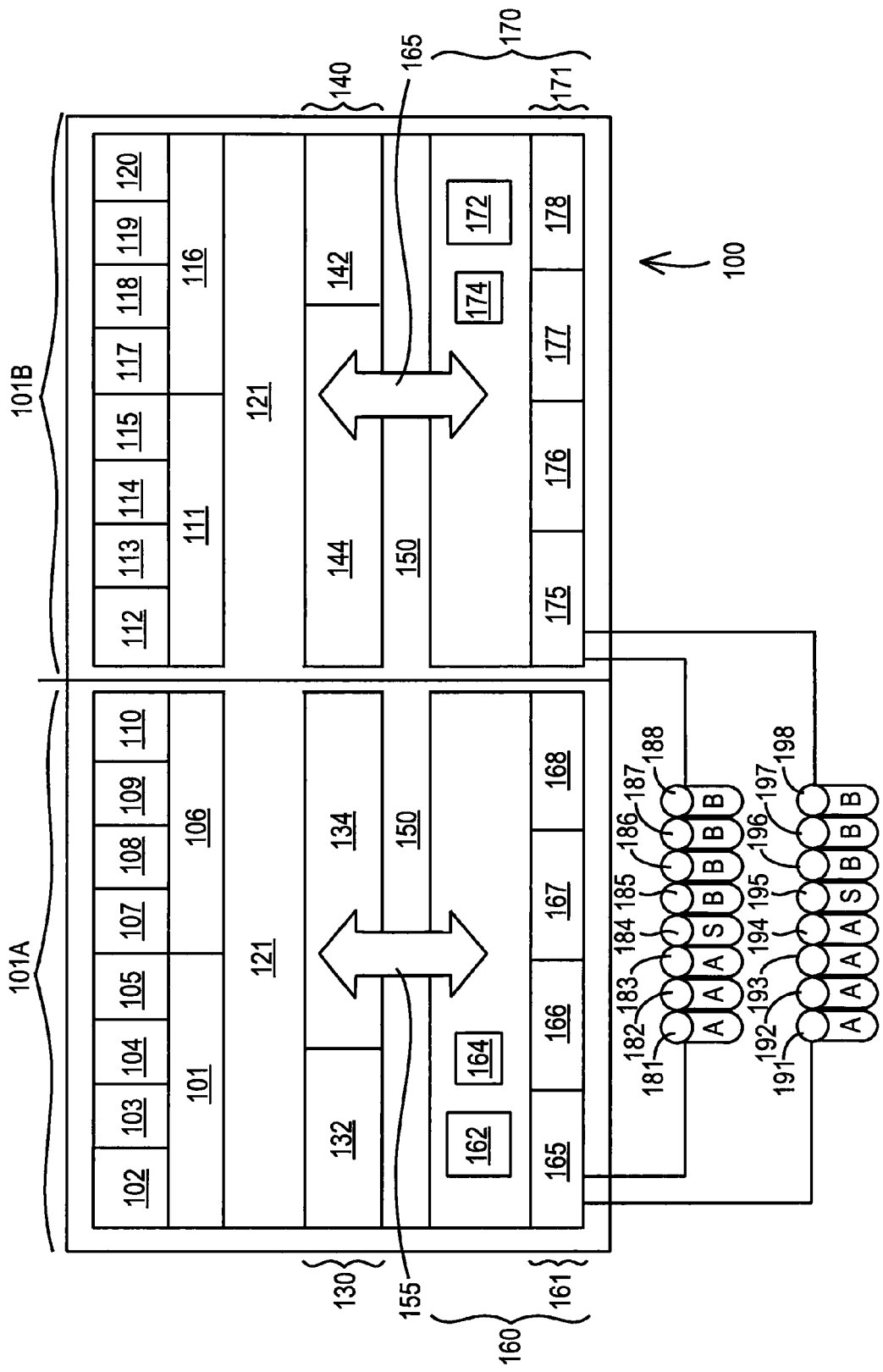
FIG. 1 is a block diagram showing the components of Applicants' data storage and retrieval system.

Referring now to FIG. 1, Applicants' information storage and retrieval system 100 includes a first cluster 101A and a second cluster 101B. Each cluster includes a processor portion 130/140 and an input/output portion 160/170. Internal PCI buses in each cluster are connected via a Remote I/O bridge 155/165 between the processor portions 130/140 and I/O portions 160/170, respectively.

Information storage and retrieval system 100 further includes a plurality of host adapters 102-105, 107-110, 112-115, and 117-120, disposed in four host bays 101, 106, 111, and 116. Each host adapter may comprise one Fibre Channel port, one FICON port, two ESCON ports, or two SCSI ports. Each host adapter is connected to both clusters through one or more Common Platform Interconnect buses 121 and 150 such that each cluster can handle I/O from any host adapter.

Processor portion 130 includes processor 132 and cache 134. Processor portion 140 includes processor 142 and cache 144. I/O portion 160 includes non-volatile storage ("NVS") 162 and NVS batteries 164. I/O portion 170 includes NVS 172 and NVS batteries 174.

I/O portion 160 further comprises a plurality of device adapters, such as device adapters 165, 166, 167, and 168, and sixteen disk drives organized into two RAID ranks, namely RAID rank "A" and RAID rank "B". In certain embodiments, RAID ranks "A" and "B" utilize a RAID 5 protocol. In certain embodiments, RAID ranks "A" and "B" utilize a RAID 10 protocol.

As those skilled in the art will appreciate, a RAID (Redundant Array of Independent Disks) rank combines multiple inexpensive disk drives into an array of disk drives to obtain performance, capacity and reliability that exceeds that of a single large drive. This array of drives, often referred to as the "RAID rank," appears to the host computer as a single logical drive.

RAID rank "A" includes disk drives 181, 182, 183, 184, 191, 192, and 193. RAID rank "B" includes disk drives 185, 186, 187, 188, 195, 196, 197, and 198. Each loop includes at least two spare disks, namely disks 184 and 195. Each of the RAID ranks includes one of those spare disks. As those skilled in the art will appreciate, adding a third RAID rank to loop 290 would not require the inclusion of a third spare disk.

Figure 2:
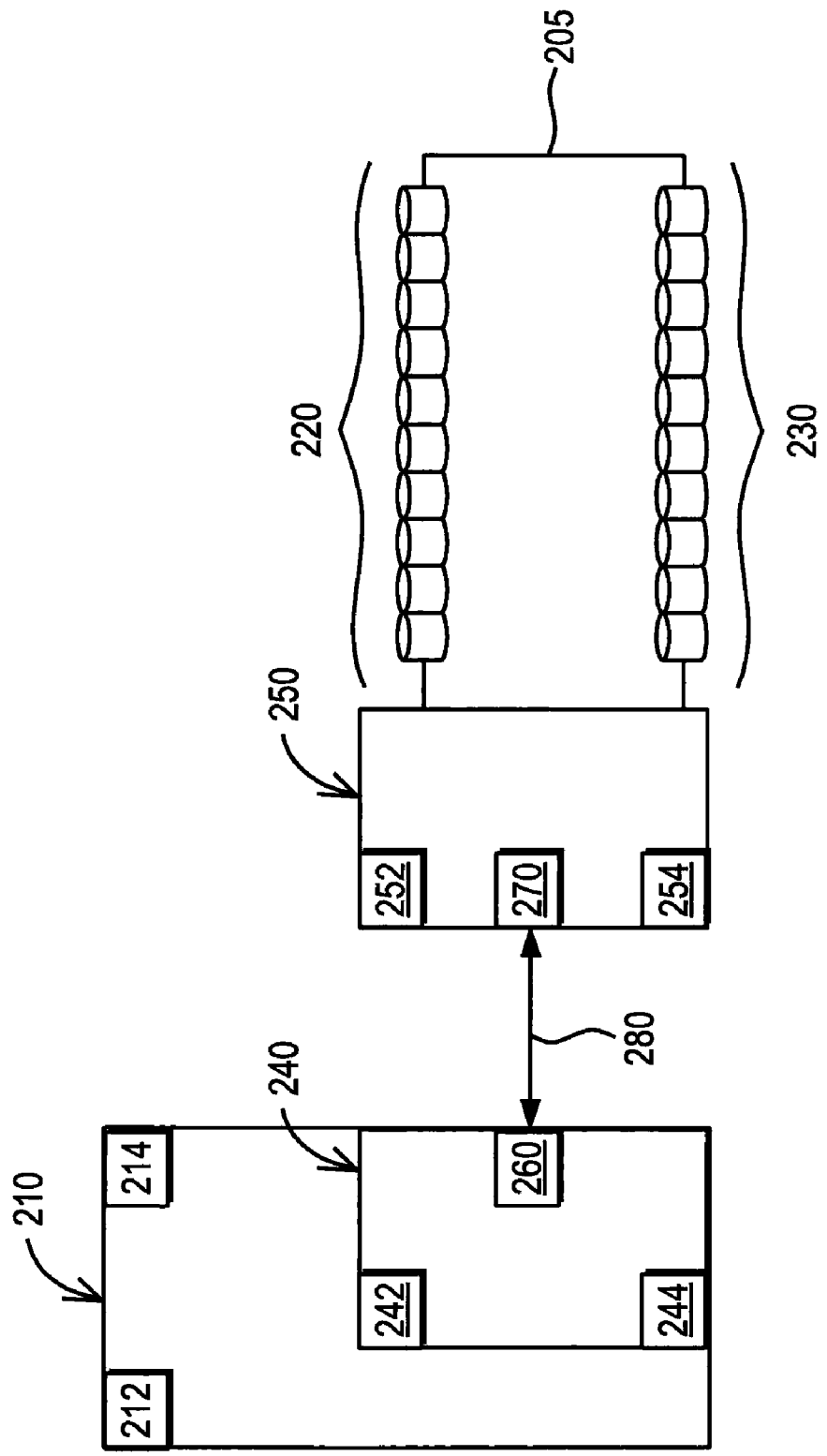
FIG. 2 is a block diagram showing a device adapter in combination with two RAID ranks.

Referring now to FIG. 2, in certain embodiments, the one or more RAID ranks are interconnected with the one or more device adapters via one or more communication links. In the illustrated embodiment of FIG. 2, RAID rank 220 and RAID rank 230 are interconnected on loop 205. Loop 205 further includes communication link control card 250. Device adapter 210 includes one or more communication link control cards, such as communication link control card 240.

Communication link control card 240 includes passive transponder reader 260. Communication link control card 250 includes passive transponder reader 270. Communication link 280 interconnects device adapter 210 and RAID ranks 220 and 230, via communication link control cards 240 and 250.

Figure 3:
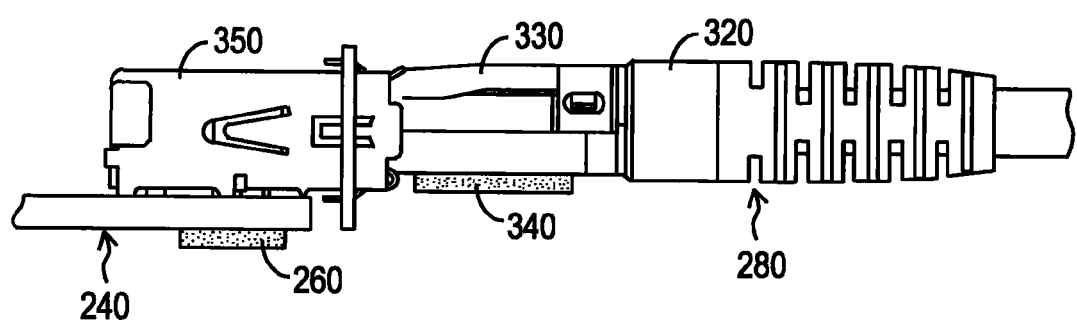
FIG. 3 is side view of Applicants' communication link interconnected to Applicants' communication link control card.

Referring now to FIG. 3, communication link 280 (FIGS. 2, 3) includes first end 320, connector 330, passive transponder 340, and a second end (not shown in FIG. 3). In certain embodiments, that second end is interconnected with a second communication link control card, such as communication link control card 250 (FIG. 2).

Communication link control card 240 includes connector 350 and passive transponder reader 260. Passive transponder 340 is disposed on first end 320, and passive transponder reader 260 is disposed on communication link control card 240, such that when connector 330 is releaseably connected with connector 350, reader 260 can read information from transponder 340.

Connectors 330 and 350 are designed such that those connectors may be releaseably interconnected to one another. In certain embodiments, connector 330 comprises a "male" configuration and connector 350 comprises a "female" configuration. In other embodiments, connector 330 comprises a "female" configuration and connector 350 comprises a "male" configuration.

In certain embodiments, passive transponder reader 260 includes an anticollision protocol which allows operation of multiple passive transponders simultaneously in the field of the reader antenna. In certain embodiments, passive transponder reader 260 comprises a Philips HTRM800 long range reader module.

By "passive transponder," Applicants mean a device which transfers data bi-directionally but that includes no power source. Rather, passive transponder 340 receives power by an RF link with reader 260. In certain embodiments, data transmission from passive transponder 340 to reader 260 uses Manchester or biphase coding and Amplitude Shift Keying modulation. Absorption modulation is used to transmit data from the transponder to the reader. The passive transponder absorbs the magnetic field which then modulates the current in the reader antenna. In certain embodiments, passive transponder 340 has an operating frequency of about 125 kHz. In certain embodiments, passive transponder 340 comprises a unique 32-bit serial number identifier. In certain embodiments, passive transponder 340 comprises a Philips HITAG 1 stick transponder.

In certain embodiments, passive transponder 340 includes a non-volatile memory. In certain embodiments, that non-volatile memory comprises an EEPROM device. In certain embodiments, that EEPROM device has a storage capacity of about 2048 bits.

Figure 4:
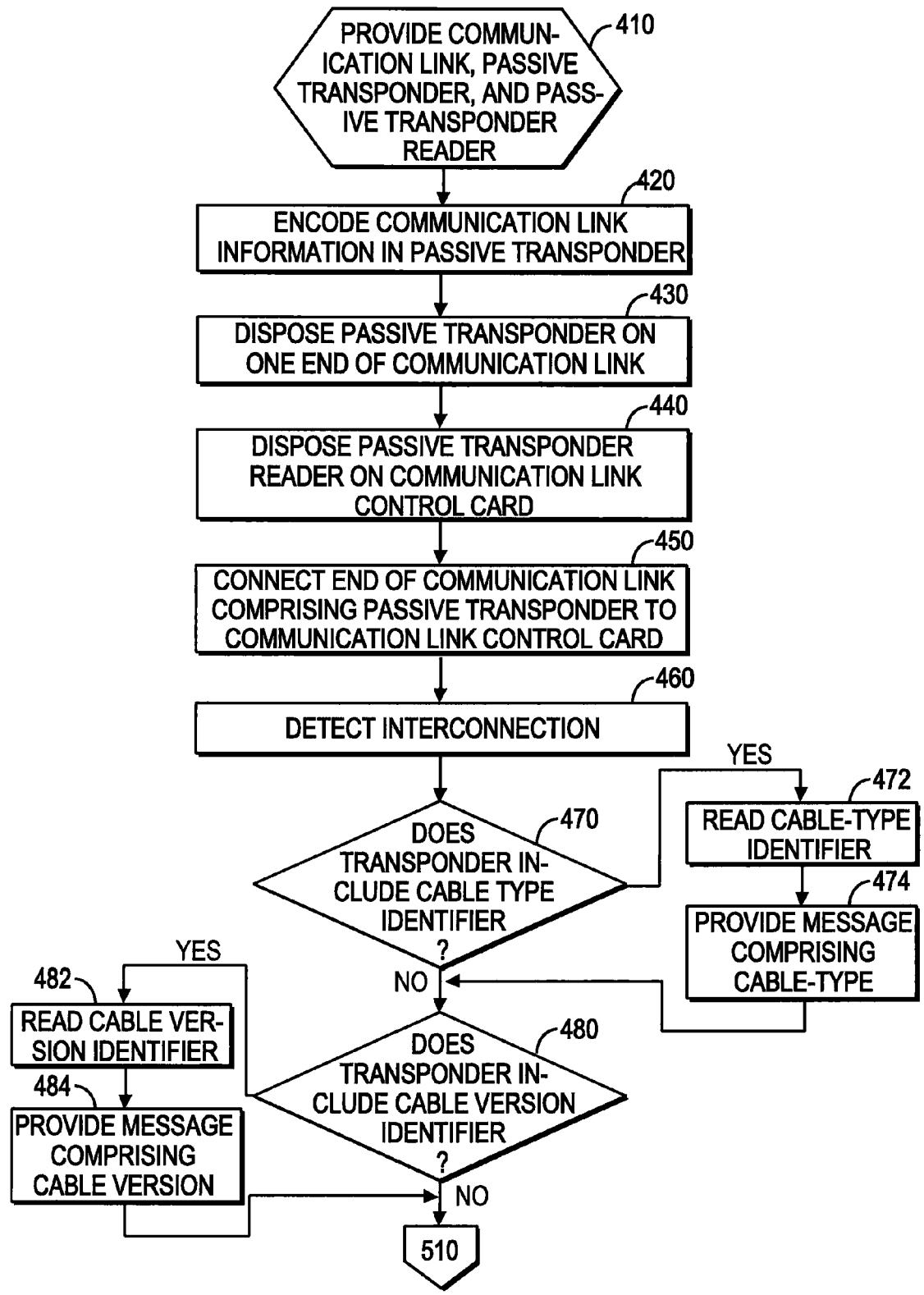
FIG. 4 is a flow chart summarizing the initial steps of Applicants' method.

Applicants' invention includes a method to provide a signal using a communication link comprising a passive transponder in combination with Applicants' communication link control card. FIG. 4 summarizes certain steps of Applicants' method relating to installation of the communication link. Referring now to FIG. 4, in step 410 the method provides a communication link, a passive transponder, and a passive transponder reader.

In step 420, Applicants' method encodes in the passive transponder information regarding the communication link. In certain embodiments, the information of step 420 includes the physical length of the communication link. In certain embodiments, the information of step 420 includes a cable-type identifier. In certain embodiments, the information of step 420 includes a nominal data transfer rate for the communication link. In certain embodiments, the information of step 420 includes a cable version identifier.

In certain embodiments, step 420 utilizes certain protocols recited in Specification SFF-8053, entitled Specification for Gigabit Interface Converter ("GBIC"), where that Specification describes the GBIC for Fibre Channel applications. In certain embodiments, the information of step 420 is encoded in the passive transponder using the Data Fields recited in Table D.1 of SFF-8053. Table D.1 recites, inter alia, data addresses, field sizes, and field names for certain specified information.

In certain embodiments, the information of step 420 is encoded into an EEPROM memory device disposed in the passive transponder, where that EEPROM comprises about 2048 bits. In certain embodiments, these 2048 bits are allocated to a plurality of data registers. In certain embodiments, that plurality of data registers corresponds to the data fields recited in Table D.1 of SFF-8053.

In certain embodiments, step 420 is performed by the manufacturer of the communication link. In certain embodiments, step 420 is performed by the manufacturer or supplier of a Fiber Channel cable. In certain embodiments, step 420 is performed by a user of the communication link, whereby the user obtains the passive transponder, and then encodes the information therein.

In step 430, the method disposes the passive transponder comprising the encoded information on one end of the communication link. In certain embodiments, step 430 is performed by the manufacturer or supplier of the communication link. In other embodiments, step 430 is performed by the communication link user. In certain embodiments, step 430 precedes step 420. In certain embodiments, step 420 and 430 are performed at about the same time.

In step 440, Applicants' method disposes the passive transponder reader on Applicants' communication link control card. In certain embodiments, step 440 precedes step 420 and/or step 430. In step 450, Applicants' method interconnects to Applicants' communication link control card the end of the communication link onto which the passive transponder is disposed, such that the passive transponder reader disposed on the communication link control card is capable of reading information from the passive transponder.

In step 460, Applicants' method detects the interconnection of step 450. In certain embodiments, step 460 is performed by Applicants' communication link control card. In certain embodiments, Applicants' communication link control card is disposed in a data storage and retrieval system, such as system 100. In certain embodiments, Applicants' communication link control card is disposed in a device adapter, such as device adapter 210 (FIG. 2) disposed in Applicants' system 100. In certain of these data storage and retrieval system embodiments, step 460 is performed by a controller disposed within the data storage and retrieval system.

In step 470, Applicants' method determines if the passive transponder includes a cable-type identifier. In certain embodiments, step 470 is performed by Applicants' communication link control card. In certain embodiments, step 470 is performed by a device adapter. In certain embodiments, step 470 is performed by a controller disposed within a data storage and retrieval system.

If Applicants' method determines in step 470 that the passive transponder includes a cable-type identifier, then the method transitions from step 470 to step 472 wherein the method reads the cable-type identifier from the passive transponder. In certain embodiments, step 472 is performed by the passive transponder reader.

Applicants' method transitions from step 472 to step 474 wherein the method provides a message which includes the cable-type identifier. In certain embodiments, step 474 is performed by Applicants' communication link control card. In certain embodiments, step 474 is performed by a device adapter comprising Applicants' communication link control card. In certain embodiments, step 474 is performed by a controller disposed in Applicants' data storage and retrieval system.

If Applicants' method determines in step 470 that the passive transponder does not include a cable-type identifier, then the method transitions from step 470 to step 480 wherein the method determines if the passive transponder includes a cable version identifier. In certain embodiments, step 480 is performed by Applicants' communication link control card. In certain embodiments, step 480 is performed by a device adapter. In certain embodiments, step 480 is performed by a controller disposed within a data storage and retrieval system.

If Applicants' method determines in step 480 that the passive transponder includes a cable version identifier, then the method transitions from step 480 to step 482 wherein the method reads the cable version identifier from the passive transponder. In certain embodiments, step 482 is performed by the passive transponder reader.

Applicants' method transitions from step 482 to step 484 wherein the method provides a message which includes the cable version identifier. In certain embodiments, step 484 is performed by Applicants' communication link control card. In certain embodiments, step 484 is performed by a device adapter comprising Applicants' communication link control card. In certain embodiments, step 484 is performed by a controller disposed in Applicants' data storage and retrieval system. Applicants' method transitions from step 484 to step 510 (FIG. 5). If Applicants' method determines in step 480 that the passive transponder does not include a cable version identifier, then the method transitions from step 480 to step 510 (FIG. 5).

FIG. 5 summarizes certain steps of Applicants' method relating to providing a signal using Applicants' communication link/transponder in combination with Applicants' communication link control card. Referring now to FIG. 5, in step 510, Applicants' communication link control card receives a signal having an actual data transfer rate. In certain embodiments, the signal of step 510 is provided by one or more host computers to Applicants' data storage and retrieval system 100.

Applicants' method transitions from step 510 to step 520 wherein the method reads the passive transponder to determine the length of the communication link. In certain embodiments, step 520 includes reading by a passive transponder reader disposed on Applicants' communication link control card a communication link length data field disposed in the passive transponder, where the communication link length data field is encoded with the physical length of the communication link.

In step 530, Applicants' method adjusts certain signal characteristics based upon the communication link length determined in step 520. In certain embodiments, step 530 includes adjusting the pre-emphasis level of the signal based upon the physical length of the communication link. In certain embodiments, Applicants' communication link control card includes an SOC320 Fibre Channel Loop Switch sold in commerce by the Vixel Corporation. The SOC320 switch supports the SFF-8053 Specification. The Vixel switch automates the reading of the passive transponder such that the controlling processor can obtain the cable information from the passive transponder using the SOC320. The SOC320 supports "soft" pre-emphasis.

In certain embodiments, step 530 includes reading the passive transponder to determine the length of a Fibre Channel communication link, and adjusting the pre-emphasis to meet the Fibre Channel signal integrity standard based upon that cable length. For example, a 3 foot long HSSDC2 cable does not require any pre-emphasis to meet the Fibre Channel standard. On the other hand, a 10 foot long HSSDC2 cable may require about a twelve percent (12%) pre-emphasis to meet the Fibre Channel signal integrity standard.

Figure 6A:
FIG. 6A is a graph showing a 2.5 Gbps signal without pre-emphasis.
Figure 6B:
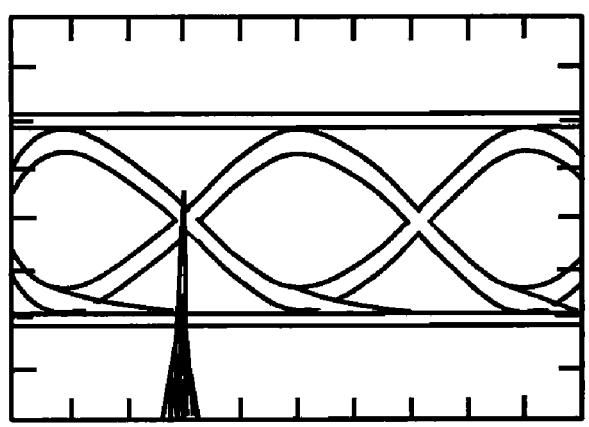
FIG. 6B is a graph showing a 2.5 Gbps signal with pre-emphasis.

Referring now to FIGS. 6A and 6B, graph 600 shows the trace of a 2.5 Gbps signal with no pre-emphasis. Graph 6B shows that same 2.5 Gbps signal with pre-emphasis. As those skilled in the art will appreciate, the signal of FIG. 6B is less likely to include one or more bit errors than the signal of FIG. 6A.

Referring again to FIG. 5, Applicants' method transitions from step 530 to step 540 wherein the method determines if the passive transponder includes a nominal data transfer rate identifier. In certain embodiments, step 540 is performed by Applicants' communication link control card. In certain embodiments, step 540 is performed by a device adapter comprising Applicants' communication link control card. In certain embodiments, step 540 is performed by a controller disposed in Applicants' data storage and retrieval system.

If Applicants' method determines in step 540 that the passive transponder includes a nominal data transfer rate identifier, then the method transitions from step 540 to step 550 wherein the method reads the nominal data transfer rate from the passive transponder. In certain embodiments, step 550 is performed by Applicants' communication link control card. In certain embodiments, step 550 is performed by a device adapter comprising Applicants' communication link control card. In certain embodiments, step 550 is performed by a controller disposed in Applicants' data storage and retrieval system.

Applicants' method transitions from step 550 to step 560 wherein the method determines if the nominal data transfer rate is greater than or equal to the actual data transfer rate of step 510. In certain embodiments, step 550 is performed by Applicants' communication link control card. In certain embodiments, step 550 is performed by a device adapter comprising Applicants' communication link control card. In certain embodiments, step 550 is performed by a controller disposed in Applicants' data storage and retrieval system.

If Applicants' method determines in step 560 that the nominal data transfer rate is greater than or equal to the actual data transfer rate, then Applicants' method transitions from step 560 to step 510 and continues. Alternatively, if Applicants' method determines in step 560 that the nominal data transfer rate is not greater than or equal to the actual data transfer rate, then the method transitions from step 560 to step 570 wherein the method provides an error message. In certain embodiments, step 570 is performed by Applicants' communication link control card. In certain embodiments, step 570 is performed by a device adapter comprising Applicants' communication link control card. In certain embodiments, step 570 is performed by a controller disposed in Applicants' data storage and retrieval system. Applicants' method transitions from step 570 to step 510 and continues.

The embodiments of Applicants' method recited in FIGS. 4 and 5 may be implemented separately. Moreover, in certain embodiments, individual steps recited in FIGS. 4 and/or 5 may be combined, eliminated, or reordered.

Applicants' invention further includes an article of manufacture comprising a computer useable medium, such as computer useable medium 212 (FIG. 2) and/or computer useable medium 242 (FIG. 2) and/or computer useable medium 252 (FIG. 2), having computer readable program code disposed therein to provide a signal using a communication link by implementing some or all of the steps of FIGS. 4 and 5.

Applicants' invention further includes a computer program product, such as computer program product 214 (FIG. 2) and/or 244 (FIG. 2), and/or 254 (FIG. 2), usable with a programmable computer processor having computer readable program code embodied therein to provide a signal using a communication link by implementing some or all of the steps of FIGS. 4 and 5.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to provide a signal via a communication link, comprising the steps of:
    providing an information storage and retrieval system comprising a controller (132), device adapter (210) interconnected to said controller and comprising a first communication link control card (240) comprising a transponder reader (260), a first connector (350), a first RAID rank (220) comprising a first array of disk drives, a second RAID rank (230) comprising a second array of disk drives, a communication loop (205) comprising a second communication link control card (250) wherein said communication loop interconnects said first RAID rank and said second RAID rank;
    providing a communication link (280) comprising a length, an end (320), a second connector (330) disposed on said end, and a passive transponder (340) disposed on said second connector, wherein said passive transponder (340) includes a memory comprising information including said length;
    interconnecting said first connector (350) and said second connector (330);
    wirelessly reading said information from said memory by said first communication link control card; and
    adjusting a pre-emphasis level of said signal based upon said information wherein:
    said second connector (330) is disposed external to said device adapter (210);
    said passive transponder (340) is disposed external to said device adapter (210);
    said transponder reader (260) is disposed within said device adapter (210).

2. The method of claim 1, wherein said first communication link control card comprises a reading device, further comprising the steps of:
    interconnecting said communication link to said communication link control card, such that said reading device is capable of reading said information from said memory.

3. The method of claim 1, wherein said communication link comprises a length, and wherein said passive transponder comprises a length data field; further comprising the steps of:
    encoding said length in said length data field;
    reading said length from said length data field;
    adjusting said pre-emphasis of said signal based upon said length.

4. The method of claim 1, wherein said signal comprises an actual throughput rate and wherein said communication link comprises a nominal throughput rate, and wherein said passive transponder comprises a throughput data field, further comprising the steps of:
    encoding said nominal throughput rate in said throughput data field;
    reading said nominal throughput rate from said throughput data field;
    determining if said nominal throughput rate is greater than or equal to said actual throughput rate;
    operative if said nominal throughput rate is not greater than or equal to said actual throughput rate, generating an error message.

5. The method of claim 1, wherein said communication link comprises a cable type, and wherein said passive transponder comprises a cable identifier data field, further comprising the steps of:
    encoding said cable type in said cable identifier data field;
    reading said cable type from said cable identifier data field, providing a signal comprising said cable type.

6. The method of claim 5, further comprising the step of detecting the interconnection of said communication link to said communication link control card.

7. The method of claim 1, wherein said communication link comprises a version number, and wherein said passive transponder comprises a version identifier data field, further comprising the steps of:
    encoding said version number in said version identifier data field;
    reading said version number from said version identifier data field, and
    providing a signal comprising said version number.

8. An article of manufacture comprising a controller (132), device adapter (210) interconnected to said controller and comprising a first communication link control card (240) comprising a transponder reader (260), a first connector (350), a first RAID rank (220) comprising a first array of disk drives, a second RAID rank (230) comprising a second array of disk drives, a communication loop (205) comprising a second communication link control card (250) wherein said communication loop interconnects said first RAID rank and said second RAID rank, and a computer useable medium having computer readable program code disposed therein to provide a signal via a communication link (280), wherein said communication link comprises a length, an end (320), a second connector (330) disposed on said end, and a passive transponder (340) disposed on said second connector, wherein said first connector (350) is interconnected to said second connector (330), wherein:
    said passive transponder includes a memory comprising information including said length;
    said second connector (330) is disposed external to said device adapter (210);
    said passive transponder (340) is disposed external to said device adapter (210);
    said transponder reader (260) is disposed within said device adapter (210) the computer readable program code comprising a series of computer readable program steps to effect:
    wirelessly reading said information from said memory by either said first communication link control card or by said second communication link control card; and
    adjusting a pre-emphasis level of said signal based upon said information.

9. The article of manufacture of claim 8, wherein said first communication link control card comprises a reading device, wherein said communication link is interconnected to said communication link control card such that said reading device is capable of reading information from said one or more data fields.

10. The article of manufacture of claim 8, wherein said communication link comprises a length, and wherein said passive transponder comprises a length data field, and wherein said length is encoded in said length data field, said computer readable program code further comprising a series of computer readable program steps to effect:
   reading said length from said length data field;
   adjusting said pre-emphasis of said signal based upon said length.

11. The article of manufacture of claim 8, wherein said signal comprises an actual throughput rate, and wherein said communication link comprises a nominal throughput rate, and wherein said passive transponder comprises a throughput data field, and wherein said nominal throughput rate is encoded in said throughput data field, said computer readable program code further comprising a series of computer readable program steps to effect:
   reading said nominal throughput rate from said throughput data field;
   determining if said nominal throughput rate is greater than or equal to said actual throughput rate;
   operative if said nominal throughput rate is not greater than or equal to said actual throughput rate, generating an error message.

12. The article of manufacture of claim 8, wherein said communication link comprises a cable type, and wherein said passive transponder comprises a cable identifier data field, and wherein said cable type is encoded in said cable identifier data field, said computer readable program code further comprising a series of computer readable program steps to effect:
   reading said cable type from said cable identifier data field;
   providing a signal comprising said cable type.

13. The article of manufacture of claim 12, said computer readable program code further comprising a series of computer readable program steps to effect detecting the interconnection of said communication link to said communication link control card.

14. The article of manufacture of claim 8, wherein said communication link comprises a version number, and wherein said passive transponder comprises a version identifier data field, and wherein said version number is encoded in said version identifier data field, said computer readable program code further comprising a series of computer readable program steps to effect:
   reading said version number from said version identifier data field, and
   providing a signal comprising said version number.

15. The article of manufacture of claim 14, said computer readable program code further comprising a series of computer readable program steps to effect detecting the interconnection of said communication link to said communication link control card.

16. A computer program product encoded in a non-transitory information storage medium and usable with a programmable computer processor to provide a signal via a communication link wherein said computer program product is disposed in an information storage and retrieval system comprising a device adapter (210) interconnected to said programmable computer processor, and comprising a first communication link control card (240) comprising a transponder reader (260), a first connector (350), a first RAID rank (220) comprising a first array of disk drives, a second RAID rank (230) comprising a second array of disk drives, a communication loop (205) comprising a second communication link control card (250) wherein said communication loop interconnects said first RAID rank and said second RAID rank, to provide a signal via a communication link (280), wherein said communication link comprises a length, an end 020), a second connector (330) disposed on said end, and a passive transponder (340) disposed on said second connector, wherein:
   said first connector (350) is interconnected to said second connector (330)
   said second connector (330) is disposed external to said device adapter (210);
   said passive transponder (340) is disposed external to said device adapter (210);
   said transponder reader (260) is disposed within said device adapter (210);
   said passive transponder includes a memory comprising information including said length, comprising:
   computer readable program code which causes said programmable computer processor to wirelessly read said information from said memory by either said first communication link control card or by said second communication link control card; and
   computer readable program code which causes said programmable computer processor to adjust a pre-emphasis level of said signal based upon said information.

17. The computer program product of claim 16, wherein said first communication link control card comprising a reading device such that said reading device is capable of reading said information from said memory.

18. The computer program product of claim 16, wherein said communication link comprises a length, and wherein said passive transponder comprises a length data field, and wherein said length is encoded in said length data field, further comprising:
   computer readable program code which causes said programmable computer processor to read said length from said length data field;
   computer readable program code which causes said programmable computer processor to adjust said pre-emphasis of said signal based upon said length.

19. The computer program product of claim 16, wherein said signal comprises an actual throughput rate, and wherein said communication link comprises a nominal throughput rate, and wherein said passive transponder comprises a throughput data field, and wherein said nominal throughput rate is encoded in said throughput data field, further comprising:
   computer readable program code which causes said programmable computer processor to read said nominal throughput rate from said throughput data field;
   computer readable program code which causes said programmable computer processor to determine if said nominal throughput rate is greater than or equal to said actual throughput rate;
   computer readable program code which, if said nominal throughput rate is not greater than or equal to said actual throughput rate, causes said programmable computer processor to generate an error message.

20. The computer program product of claim 16, wherein said communication link comprises a cable type, and wherein said passive transponder comprises a cable identifier data field, and wherein said cable type is encoded in said cable identifier data field, further comprising:
   computer readable program code which causes said programmable computer processor to read said cable type from said cable identifier data field, computer readable program code which causes said programmable computer processor to provide a signal comprising said cable type.

21. The computer program product of claim 20, further comprising computer readable program code which causes said programmable computer processor to detect the interconnection of said communication link to said communication link control card.

22. The computer program product of claim 16, wherein said communication link comprises a version number, and wherein said passive transponder comprises a version identifier data field, and wherein said version number is encoded in said version identifier data field, further comprising:
   computer readable program code which causes said programmable computer processor to read said version number from said version identifier data field, and
   computer readable program code which causes said programmable computer processor to provide a signal comprising said version number.

23. The computer program product of claim 22, further comprising computer readable program code which causes said programmable computer processor to detect the interconnection of said communication link to said communication link control card.

24. A data storage and retrieval system, comprising:
   a controller (132);
   a device adapter (210) interconnected to said controller and comprising a first communication link control card (240) comprising a first connector (350) and a first reading device (260);
   a first RAID rank (220) comprising a first array of disk drives;
   a second RAID rank (230) comprising a second array of disk drives;
   a communication loop (205) comprising a second communication link control card (250) wherein said communication loop (205) interconnects said first RAID rank (220) and said second RAID rank (230);
   a communication link (280) comprising a length, an end (320), a second connector (330) disposed on said end, and a passive transponder (340) disposed on said second connector, wherein said passive transponder (340) includes a memory comprising information including said length;
   wherein said first connector (350) is connector is interconnected with said second connector (330) such that information from said memory by be wirelessly read by either said first communication link control card or by said second communication link control card to adjust a pre-emphasis level of a signal provided by said communication link;
   wherein:
   said second connector (330) is disposed external to said device adapter (210);
   said passive transponder (340) is disposed external to said device adapter (210);
   said transponder reader (260) is disposed within said device adapter (210).

25. The data storage and retrieval system of claim 24, further comprising:
   wherein said communication link interconnects said first communication link control card and said second communication link control card, such that either said first reading device or said second reading device can read said information from said memory.

26. The data storage and retrieval system of claim 24, wherein said passive transponder comprises a length data field, and wherein said length is encoded in said length data field.

27. The data storage and retrieval system of claim 24, wherein said communication link comprises a fiber channel communication link, and wherein said passive transponder comprises a cable-type data field, and wherein said cable-type data field indicates that said communication link comprises a fiber channel communication link.

28. The data storage and retrieval system of claim 24, wherein said communication link further comprises a nominal throughput rate, and wherein said passive transponder comprises a throughput data field, and wherein said nominal throughput rate is encoded in said throughput data field.

29. The data storage and retrieval system of claim 24, wherein said communication link further comprises a cable version number, and wherein said passive transponder comprises a version data field, and wherein said version number is encoded in said version data field.

* * * * *